US006377681B1

(12) United States Patent
Bremner

(10) Patent No.: US 6,377,681 B1
(45) Date of Patent: Apr. 23, 2002

(54) SIGNAL LINE DRIVING CIRCUIT WITH SELF-CONTROLLED POWER DISSIPATION

(75) Inventor: Duncan James Bremner, Lochwinnoch (GB)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/053,110

(22) Filed: Apr. 1, 1998

(51) Int. Cl.[7] .................. H04L 12/66; H04M 1/00; H04M 7/04
(52) U.S. Cl. .................. 379/394; 379/413; 379/398; 370/463
(58) Field of Search .................. 713/300, 326, 713/327; 379/378, 398, 413, 399, 402, 403, 394, 404, 324; 370/522, 311, 463; 340/662, 663, 635

(56) References Cited

U.S. PATENT DOCUMENTS

| 5,138,658 A | * | 8/1992 | Carter et al. ............ 379/378 |
| 5,323,461 A | * | 6/1994 | Rosenbaum et al. ...... 379/399 |
| 5,428,682 A | * | 6/1995 | Apfel .................... 379/413 |
| 5,881,129 A | * | 3/1999 | Chen et al. .............. 379/5 |
| 5,898,235 A | * | 4/1999 | McClure ................ 307/64 |
| 5,912,513 A | * | 6/1999 | Hollenbach et al. ...... 379/413 |
| 6,005,934 A | * | 12/1999 | Pepper et al. ........... 379/398 |

\* cited by examiner

*Primary Examiner*—Ajit Patel
*Assistant Examiner*—Hanh Nguyen
(74) *Attorney, Agent, or Firm*—Wildman, Harrold, Allen & Dixon; Mark Dalla Valle

(57) ABSTRACT

A signal line driving circuit with power control for selectively reducing internal power dissipation when driving an external load. While driving the external load with a constant current the output voltage generated across such load is monitored. If the load impedance decreases sufficiently to cause the output voltage to fall below a predetermined threshold value and, therefore, cause the voltage across the signal line driving circuit to increase, the magnitude of the power supply voltage is automatically reduced, thereby reducing the voltage across the signal line driving circuit. Such a signal line driving circuit is particularly advantageous as a subscriber line interface circuit (SLIC). As the subscriber goes from an on-hook condition to an off-hook condition and if the subscriber loop is sufficiently short (or low in impedance), a lower power supply voltage is used to minimize the power dissipation of the SLIC while still maintaining the required subscriber loop current.

16 Claims, 2 Drawing Sheets

SIGNAL LINE DRIVING CIRCUIT WITH SELF-CONTROLLED POWER DISSIPATION

BACKGROUND OF THE INVENTION

1. Field of the Invention

The present invention relates to signal line driving circuits for providing output signals with approximately constant output currents, and in particular, to subscriber line interface circuits for telephone lines.

2. Description of the Related Art

A subscriber line interface circuit (SLIC) is used for each pair of wires ("tip" and "ring") forming a subscriber telephone line and is responsible for conveying both incoming and outgoing signals (e.g., voice, facsimile and data) while providing necessary power and impedance matching. Such circuit is typically located in the central office and is analog in its function, although digital versions (e.g., ISDN) are being used more often.

When the subscriber telephone is on-hook the DC output current, neglecting any leakage impedances, is substantially zero. When the subscriber loop goes into an off-hook state, industry standards require a DC output current through the subscriber loop to be approximately constant, e.g., within the nominal range of 30–40 milliamperes (mA). This DC current provides power to the subscriber telephone circuitry, such as the digital keypad. The impedance of the subscriber loop will depend upon the particular telephone, or telephones, connected to the loop, as well as the transmission length of the loop itself. Therefore, the SLIC must be designed to provide the nominal required DC output current for this range of loop impedances while still providing for transmission of the AC signals (voice, facsimile, etc.).

Based upon the foregoing, the following typical scenarios will be encountered. With an output current of 30 mA, a nominal DC power supply voltage of 50 volts for the SLIC, and a subscriber loop impedance of 1000 ohms (resistive), the output voltage presented to the subscriber loop will be 30 volts (=30 mA×1000 ohms). Accordingly, 20 volts will be dropped across the SLIC output circuitry, thereby resulting in approximately 0.6 watts (=30 mA×20 volts) of power dissipation in the output circuitry of the SLIC. However, if the subscriber loop impedance is instead only 500 ohms, then the output voltage becomes 15 volts (=30 mA×500 ohms). This results in 35 volts being dropped across the output circuitry of the SLIC, which, in turn, results in an internal power dissipation of approximately 1.05 watts (=30 mA×35 volts). Hence, it can be seen that, depending upon the subscriber loop impedance, a wide variance in the internal power dissipation of the SLIC can be encountered. Such a wide variance in internal power dissipation imposes substantial design constraints for the SLIC, and prevents such SLIC from performing at maximum efficiency.

A number of attempts to minimize the internal power dissipation of the SLIC have included such techniques as using an external resistor (connected in series with the power supply) for dissipating the excess power and using a switching voltage regulator. However, both techniques have significant disadvantages. Simply relocating the power dissipation to an external resistor does not improve overall efficiency of the system, and while a switching voltage regulator may improve power efficiency, significant switching noise can be induced into the subscriber loop.

Accordingly, it would be desirable to have a technique by which internal power dissipation can be automatically reduced by maximizing power efficiency and avoiding any introduction of signal noise.

SUMMARY OF THE INVENTION

A signal line driving circuit with self-controlled internal power dissipation in accordance with the present invention minimizes internal power dissipation while maximizing overall power efficiency and avoiding introduction of extraneous signal noise into the system.

In accordance with one embodiment of the present invention, a signal line driving circuit with power control for selectively reducing internal power dissipation when driving an external load includes a signal driver circuit and a power control circuit. The signal driver circuit is configured to connect and provide an output signal to an external impedance and to receive a source current and an input signal which corresponds to such output signal and in accordance therewith provide such output signal and a control signal which varies in relation to such output signal. The output signal includes an output current which is approximately constant and an output voltage which varies in relation to the external impedance and output current. The power control circuit, coupled to the signal driver circuit, is configured to connect to a plurality of voltage sources and receive therefrom a plurality of source voltages and to receive the control signal and in accordance therewith convey the source current from one of the plurality of voltage sources to the signal driver circuit.

In accordance with another embodiment of the present invention, a method of driving an external load via a signal line while selectively reducing power dissipation includes the steps of:

connecting to an external impedance;

connecting to a plurality of voltage sources;

applying an output signal to the external impedance;

receiving a source current and an input signal which corresponds to the output signal and in accordance therewith generating the output signal and a control signal which varies in relation to the output signal, wherein the output signal includes an output current which is approximately constant and an output voltage which varies in relation to the external impedance and the output current;

receiving a plurality of source voltages from the voltage sources; and receiving the control signal and in accordance therewith conveying the source current from one of the plurality of voltage sources.

These and other features and advantages of the present invention will be understood upon consideration of the following detailed description of the invention and the accompanying drawings.

DETAILED DESCRIPTION OF THE INVENTION (While the following discussion is in the context of a subscriber line interface circuit (SLIC) for telephone signals, it should be recognized that the underlying principles of the present invention can be applied to other forms of circuits which provide output signals with substantially constant currents and for which self-control of internal power dissipation is desired.)

Figure 1:
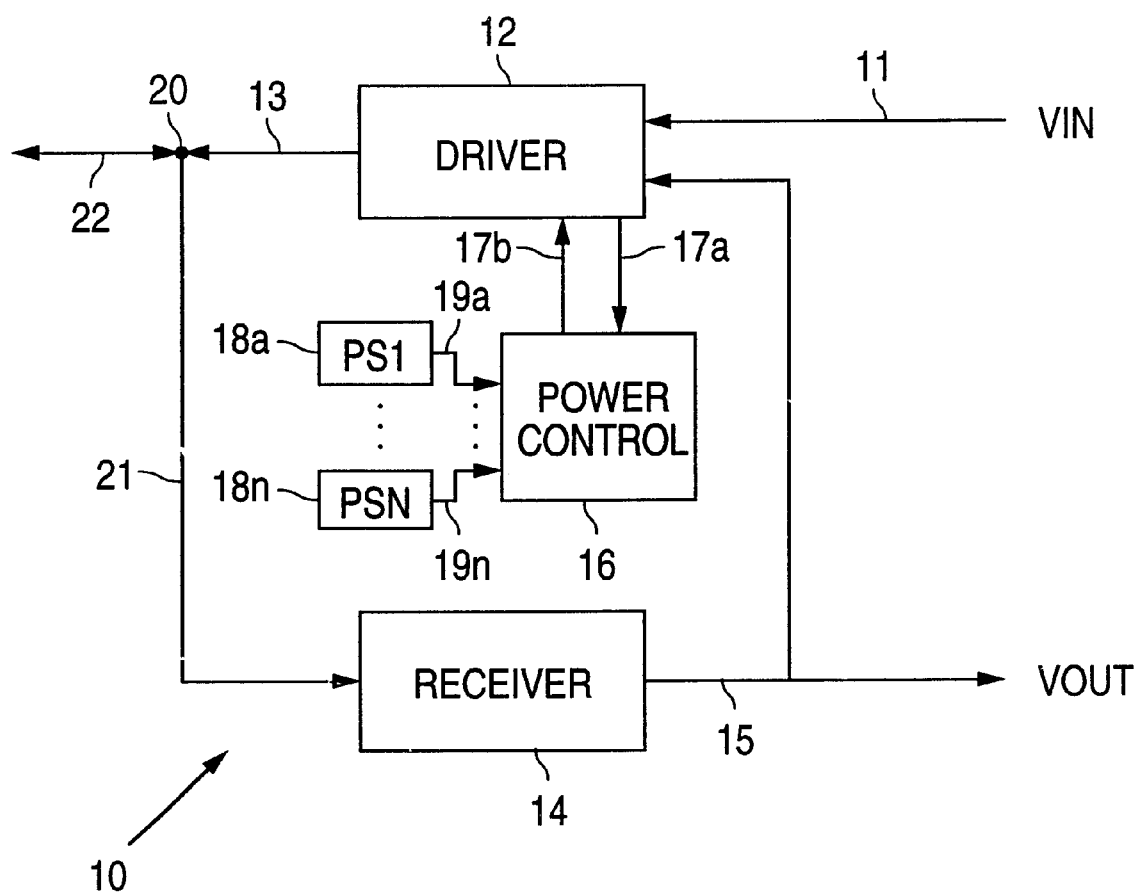
FIG. 1 is a functional block diagram of a signal interface system using a signal line driving circuit with self-controlled internal power dissipation in accordance with one embodiment of the present invention.

Referring to FIG. 1, a bi-directional signal interface system 10 using a signal line driving circuit with self-controlled internal power dissipation in accordance with one embodiment of the present invention includes a driver stage 12, a receiver stage 14, a power control stage 16 and multiple power sources 18, interconnected substantially as shown. The driver stage 12 provides an output signal 13 to an output node 20 for conveyance to an external signal line 22. The output node 20 also conveys from the external signal line 22 an input signal 21 which is processed by the receiver 14. The output signal 15 from the receiver 14 is fed back to the driver stage 12. As is well known in the art of SLICs, this allows for duplex operation of the external signal line 22 by subtracting out the receiver output signal 15 from the input signal 11 to the driver stage 12.

The driver stage 12 provides a feedback signal 17a to the power control stage 16 which provides DC power 17b to the driver stage 12. Based upon the feedback signal 17a, the power control stage 16 selects one of multiple DC voltages 19 from the DC power sources 18. For example, when the load impedance presented via the external signal line 22 is low, based upon the output signal 13 current, the output voltage presented to the output node 20 is low. When this output voltage becomes low enough that the resulting voltage drop across the output of the driver stage 12 (Vdriver=Vsource−Voutput) exceeds a predetermined threshold (Vdriver>Vthreshold), the feedback signal 17a can instruct the power control stage 16 to select a lower power supply voltage 19 from another power source 18 (discussed in more detail below).

Figure 2:
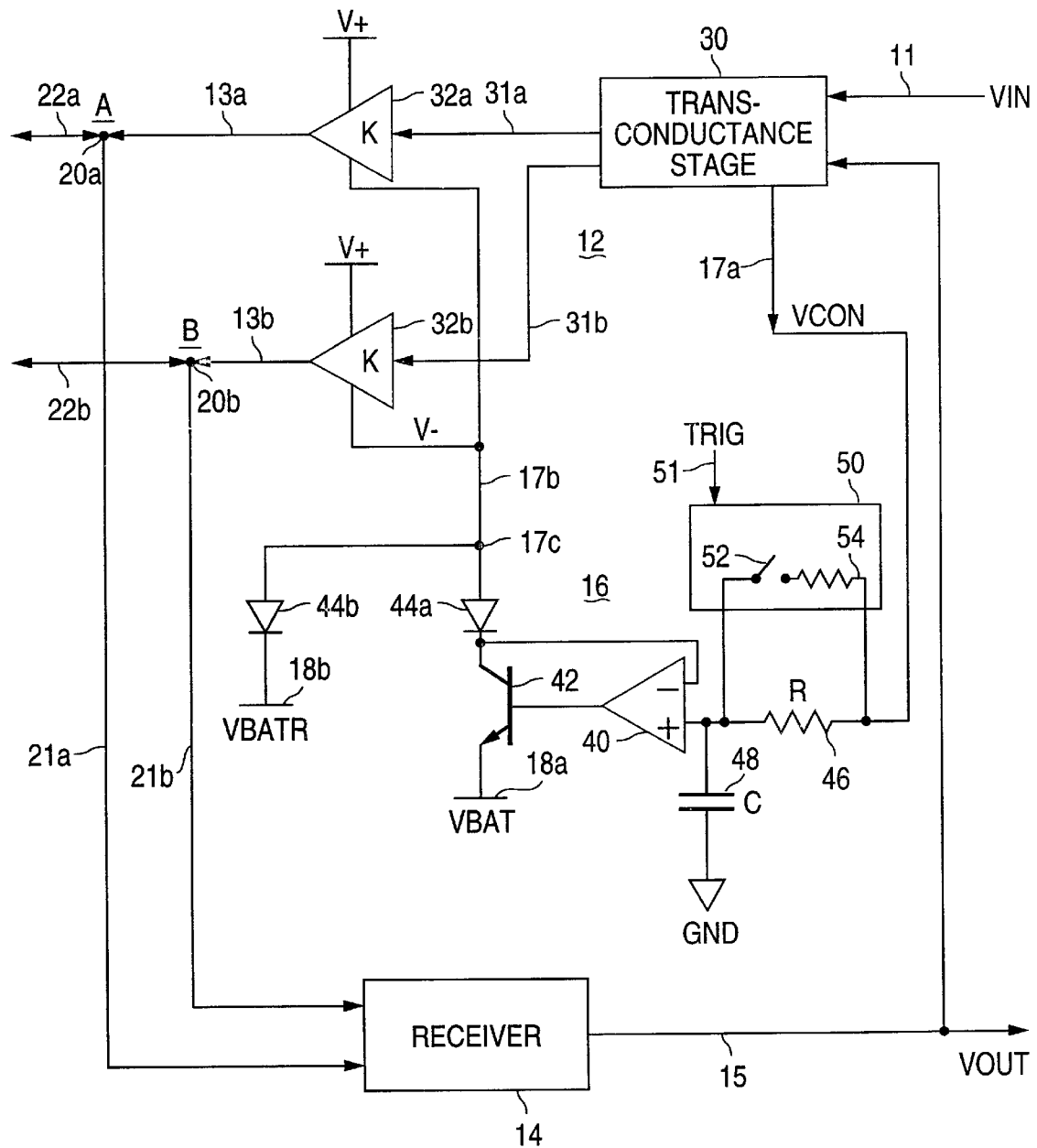
FIG. 2 is a more detailed functional block and schematic diagram of the signal line driving circuit portion of the system of FIG. 1.

Referring to FIG. 2, the driver 12 and power control 16 stages in accordance with one embodiment of the present invention are shown in more detail. In this embodiment, as would be typical for a SLIC, the external circuit is a differential circuit. Accordingly, the output node 20 includes two nodes 20a, 20b and the external signal line 22 includes two lines 22a, 22b. In the context of a SLIC, these two signal lines 22a, 22b form the subscriber loop.

The driver stage 12 includes a transconductance stage 30 which differentially receives the input voltage signals 11, 15 and generates two intermediate current signals 31a, 31b which are buffered by output driver amplifiers 32a, 32b. These amplifiers 32a, 32b provide the approximately constant output current signals 13a, 13b (discussed in more detail below) to the output nodes 20a, 20b. (As discussed above, the output nodes 20a, 20b also receive the incoming signals 21a, 21b from the subscriber loop 22a, 22b which are processed by the receiver 14 in accordance with well known principles.) These amplifiers 32a, 32b are powered by positive and negative power sources. The positive power source V+ is typically zero for telecommunications applications. The negative power source V− is a negative supply.

The power control stage 16 includes a differential amplifier 40 which drives a pass transistor connected between a diode 44a and the primary power source 18a which provides a negative power supply voltage Vbat. The input signal to the differential amplifier 40, which is the feedback, or control, signal 17a from the transconductance stage 30, is filtered by a low pass filter formed by the series resistor 46 (e.g., 500 kilohms) and shunt capacitor 48 (e.g., 220 nanofarads). Connected across the resistor 46 is a "speed up" circuit 50 which, as discussed in more detail below, selectively reduces the overall resistance so as to speed up the change in the voltage across the capacitor 48.

Another diode 44b is used to connect another power source 18b having another negative voltage Vbatr to the same node 17c as that to which the first diode 44a is connected. It is this node 17c which provides the negative power supply voltage 17b for the output driver amplifiers 32a, 32b. The first power supply voltage Vbat is the more negative voltage (e.g., −56 volts), while the second power supply voltage Vbatr is a less negative voltage (e.g., −30 volts).

As the impedance of the subscriber loop 22a, 22b reduces, such as when the subscriber goes off-hook, the differential voltage Vab at the loop nodes 20a, 20b also decreases. This voltage Vab is sensed by the receiver 14 (which typically has a high input impedance relative to the impedance of the subscriber loop and the output impedances of the driver amplifiers 32a, 32b). Accordingly, the receiver output voltage 15, which corresponds to the subscriber loop node voltage Vab, also decreases. This, in turn, causes the control voltage 17a from the transconductance stage 30 to also decrease. This control voltage 17a is generally proportional to the receiver output voltage 15 (which in turn, is generally proportional to the subscriber loop node voltage Vab), plus some amount of overhead voltage Voh necessary for the driver amplifiers 32a, 32b to operate.

As this voltage 17a decreases further, the differential amplifier 40 gradually causes the pass transistor 42 to turn off. If the control voltage 17a decreases sufficiently, the transistor 42 becomes cut off and the supply current for the negative supply terminals of the driver amplifiers 32a, 32b is then drawn through the second diode 44b from the second power supply 18b instead of through the first diode 44a from the first power supply 18a. Since this second power supply 18b has a reduced voltage Vbatr, the voltage dropped across the driver amplifiers 32a, 32b is reduced, thereby reducing the internal power dissipation of the driver amplifiers 32a, 32b. Since the output current 13a, 13b is maintained approximately constant, the signal provided to the subscriber is remains unaffected. Hence, the transition between power supply voltages is not dependent upon the actual voltage values of the power supplies 18 and occurs without introducing any signal noise.

As noted above, the output current signals 13a, 13b are approximately constant. More specifically, the output current signals 13a, 13b are approximately constant for a given impedance Zloop of the subscriber loop 22a, 22b. Hence, for example, if the impedance Zloop (e.g., the resistance Rloop) of the subscriber loop 22a, 22b increases (e.g., the loop becomes longer) and becomes less negligible with respect to the subscriber loop feed resistance Rfeed (e.g., 150 ohms) within the output circuits (not shown) of the driver amplifiers 32a, 32b, then the magnitude Iloop of the output current signals 13a, 13b will decrease in accordance with the relationship Iloop=(Vbat−Voh)/(Rloop+Rfeed). However, provided that the impedance Zloop of the subscriber loop 22a, 22b remains constant, the magnitude Iloop of the output current signals 13a, 13b will also remain constant.

Furthermore, it should be recognized that notwithstanding the similar directions of the arrows for the output current signals 13a, 13b in FIG. 2, the directions of such current signals 13a, 13b are opposite to one another. In other words, if output current 13a is flowing out to subscriber loop leg 22a via node 20a, then output current 13b is flowing in from subscriber loop leg 22b via node 20b, and vice versa.

During transient signals in the loop 22a, 22b, such as on/off-hook transient signals or dialling, the voltage provided to the loop nodes 20a, 20b must be allowed to slew quickly enough to avoid impacting the dial pulsed distortion parameters. This is achieved by shunting the resistor 46 in the input filter for the differential amplifier 40. A transient detection circuit elsewhere in the system (not shown) generates a trigger signal 51 which closes a switch 52 within the speed of circuit 50. This places a shunting resistor 54 in parallel with the original resistor 46 to reduce the overall resistance value by a sufficiently significant amount (e.g., by a factor of 100). This allows the circuit to reject speech signals during normal transmission and yet quickly slew in response to normal transient signals.

Based upon the foregoing, it should be recognized that although the power control stage 16 has been discussed in terms of switching between two power sources, it is possible to design another power control stage which, in conformance with the foregoing discussion, can select between more than two power sources. For example, by duplicating the combination of filter circuit 46, 48, differential amplifier 40, transistor 42 and diode 44a and connecting such duplicate circuits between other power sources having voltages with values intermediate to voltages Vbat and Vbatr, it is possible to provide for multiple stepped reductions in the power supply voltage provided to the driver amplifiers 32a, 32b. This would allow the power dissipation of the driver amplifiers 32a, 32b to be maintained within a fairly narrow power range.

Further based upon the foregoing, it should also be recognized that the principles of the presently claimed invention are not limited to use with circuits using negative power supplies or only bipolar technologies, but can also be applied to circuits using positive power supplies or other device technologies as well, such as metal oxide semiconductor (MOS).

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a signal line driving circuit with power control for selectively reducing internal power dissipation when driving an external load, comprising:

a signal driver circuit that connects and provides an output signal to an external impedance, receives a source current and receives an input signal which corresponds to said output signal and in response thereto provides said output signal and a control signal which varies in relation to said output signal, wherein said output signal includes an output current which is approximately constant and an output voltage which varies in relation to said external impedance and said output current; and a power control circuit, coupled to said signal driver circuit, that connects to a plurality of voltage sources and receives therefrom a plurality of source voltages and receives said control signal and in response thereto conveys a selected one of said plurality of source voltages and said source current from one of said plurality of voltage sources to said signal driver circuit, wherein, a voltage difference between said selected one of said plurality of source voltages and said output voltage varies in relation to said control signal.

2. The apparatus of claim 1, wherein said output signal comprises a differential signal.

3. The apparatus of claim 1, wherein said signal driver circuit comprises an amplifier circuit that receives an intermediate signal and said source current and in response thereto provides said output signal.

4. The apparatus of claim 3, wherein said signal driver circuit further comprises a transconductance circuit, coupled to said amplifier circuit, that receives said input signal and in response thereto provides said control signal and said intermediate signal.

5. The apparatus of claim 1, wherein said power control circuit comprises a plurality of current paths that connect between said signal driver circuit and said plurality of voltage sources, wherein, in response to said control signal, one of said plurality of current paths conveys said source current.

6. The apparatus of claim 5, wherein one of said plurality of current paths comprises a current control circuit that receives said control signal and in response thereto selectively activates and inactivates said one of said plurality of current paths, and wherein all remaining ones of said plurality of current paths become inactivated when said one of said plurality of current paths is activated, and further wherein one of said remaining ones of said plurality of current paths become activated when said one of said plurality of current paths is inactivated.

7. The apparatus of claim 6, wherein said current control circuit includes a filter circuit that filters said control signal.

8. The apparatus of claim 5, wherein each one of said plurality of current paths includes a series-connected diode.

9. A method of driving an external load via a signal line while selectively reducing power dissipation, said method comprising the steps of:

connecting to external impedance;

connecting to a plurality of voltage sources;

applying an output signal to said external impedance;

receiving a source current;

receiving an input signal which corresponds to said output signal and in response thereto generating said output signal and a control signal which varies in relation to said output signal, wherein said output signal includes an output current which is approximately constant and an output voltage which varies in relation to said external impedance and said output current;

receiving a plurality of source voltages from said plurality of voltage sources; and receiving said control signal and in response thereto conveying a selected one of said plurality of source voltages and said source current from one of said plurality of voltage sources, wherein, a voltage difference between said selected one of said plurality of source voltages and said output voltage varies in relation to said control signal.

10. The method of claim 9, wherein said step o f applying an output signal to said external impedence comprises applying a differential signal to said external impedance.

11. The method of claim 9, wherein said step of receiving an input signal which corresponds to said output signal and in response thereto generating said output signal and a control signal which varies in relation to said output signal comprises receiving an intermediate signal and in response thereto generating said output signal.

12. The method of claim 11, wherein said step of receiving an input signal which corresponds to said output signal and in response thereto generating said output signal and a control signal which varies in relation to said output signal further comprises receiving said input signal and in response thereto generating said control signal and said intermediate signal.

13. The method of claim 9, wherein said step of connecting to a plurality of voltage sources comprises connecting to said plurality of voltage sources via a plurality of current paths.

14. The method of claim 13, wherein said step of receiving said control signal and in response thereto conveying a selected one of said plurality of source voltages and said source current from one of said plurality of voltage sources comprising receiving said control signal and in response thereto selectively activating said one of said plurality of current paths and inactivating all remaining ones of said plurality of current paths, and inactivating said one of said plurality of current paths and activating one of said remaining ones of said plurality of current paths.

15. The method of claim 14, further comprising the steps of filtering said control signal, and wherein said step of receiving said control signal and in response thereto conveying a selected one of said plurality of source voltages and said source current from one of said plurality of voltage sources comprises receiving said filtered control signal and in response thereto conveying a selected one of said plurality of source voltages and said source current from one of said plurality of voltage sources.

16. The method of claim 13, wherein said step of connecting to said plurality of voltage sources via a plurality of current paths comprises connecting to each one of said plurality of current paths via a series-connected diode.

* * * * *